US010632659B2

(12) United States Patent
Nishimura et al.

(10) Patent No.: US 10,632,659 B2
(45) Date of Patent: Apr. 28, 2020

(54) ABNORMALITY DETECTION DEVICE (71) Applicant: FANUC CORPORATION, Yamanashi (JP)

(72) Inventors: Koichi Nishimura, Yamanashi-ken (JP); Toshiaki Ichihara, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 12 days.

(21) Appl. No.: 15/992,538

(22) Filed: May 30, 2018

(65) Prior Publication Data

US 2018/0345556 A1 Dec. 6, 2018

(30) Foreign Application Priority Data

Jun. 1, 2017 (JP) ................. 2017-109444

(51) Int. Cl.
*B29C 45/76* (2006.01)
*B29C 45/50* (2006.01)

(52) U.S. Cl.
CPC ........ *B29C 45/768* (2013.01); *B29C 45/5008* (2013.01); *B29C 2945/76013* (2013.01); *B29C 2945/7618* (2013.01); *B29C 2945/7623* (2013.01); *B29C 2945/76083* (2013.01); *B29C 2945/76163* (2013.01); *B29C 2945/76173* (2013.01); *B29C 2945/76214* (2013.01); *B29C 2945/76224* (2013.01); *B29C 2945/76247* (2013.01)

(58) Field of Classification Search
None
See application file for complete search history.

(56) References Cited

U.S. PATENT DOCUMENTS

| 6,258,303 B1 * | 7/2001 | Hibi ........................ B29C 45/76 264/40.5 |
| 6,311,101 B1 * | 10/2001 | Kastner .................... B29C 45/76 700/17 |
| 7,187,773 B2 * | 3/2007 | Hamada ................ G01M 15/12 381/56 |
| 8,534,128 B2 * | 9/2013 | Murayama ............. G01H 1/003 73/593 |

(Continued)

FOREIGN PATENT DOCUMENTS

| CN | 101434364 A | 5/2009 |
| CN | 101580198 A | 11/2009 |
| DE | 102006033421 B3 | 10/2007 |

(Continued)

OTHER PUBLICATIONS

English Abstract and Machine Translation for Japanese Publication No. 05-050480 A, published Mar. 2, 1993, 6 pgs.

(Continued)

*Primary Examiner* — Jacob T Minskey
*Assistant Examiner* — Baileigh Kate Darnell
(74) *Attorney, Agent, or Firm* — Fredrikson & Byron, P.A.

(57) ABSTRACT

An abnormality detection device for detecting an abnormality of a movable part provided in an injection molding machine includes: a through hole formed in the movable part or in an adjacent member arranged adjacent to the movable part; and a microphone installed inside the through hole to collect sound generated by the movement of the movable part.

8 Claims, 7 Drawing Sheets

(56) References Cited

U.S. PATENT DOCUMENTS

| | | | |
|---|---|---|---|
| 8,988,239 B2* | 3/2015 | Fang | B29C 45/768 340/506 |
| 2014/0333447 A1* | 11/2014 | Fang | B29C 45/768 340/679 |

FOREIGN PATENT DOCUMENTS

| | | | |
|---|---|---|---|
| DE | 102015012133 A1 | 3/2016 | |
| JP | 5598353 A | 7/1980 | |
| JP | 550480 A | 3/1993 | |
| JP | 6160172 A | 6/1994 | |
| JP | 7267330 A | 10/1995 | |
| JP | 11245273 A | 9/1999 | |
| JP | 2001349407 A | 12/2001 | |
| JP | 2008246711 A | 10/2008 | |
| JP | 2010181151 A | 8/2010 | |
| JP | 2011214964 A | 10/2011 | |
| JP | 2013529148 A | 7/2013 | |
| JP | 2014213412 A | 11/2014 | |

OTHER PUBLICATIONS

English Abstract and Machine Translation for Japanese Publication No. 11-245273 A, published Sep. 14, 1999, 8 pgs.

English Abstract and Machine Translation for Japanese Publication No. 2008-246711 A, published Oct. 16, 2008, 7 pgs.

English Abstract and Machine Translation for Japanese Publication No. JPH07-267330 A, published Oct. 17, 1995, 8 pgs.

English Abstract and Machine Translation for Japanese Publication No. JPH06-160172 A, published Jun. 7, 1994, 11 pgs.

English Abstract and Machine Translation for Chinese Publication No. 101580198 A, published Nov. 18, 2009, 10 pgs.

English Abstract and Machine Translation for Chinese Publication No. 101434364 A, published May 20, 2009, 21 pgs.

English Abstract and Machine Translation for Japanese Publication No. 2011-214964 A, published Oct. 27, 2011, 11 pgs.

English Abstract and Machine Translation for Japanese Publication No. 2014-213412 A, published Nov. 17, 2014, 11 pgs.

English Abstract and Machine Translation for Japanese Publication No. 2001-349407 A, published Dec. 21, 2001, 11 pgs.

English Abstract and Machine Translation for Japanese Publication No. 2010-181151 A, published Aug. 19, 2010, 10 pgs.

English Abstract and Machine Translation for Japanese Publication No. 2013-529148 A, published Jul. 18, 2013, 12 pgs.

English Abstract and Machine Translation for Japanese Publication No. 55-098353 A, published Jul. 26, 1980, 5 pgs.

English Abstract and Machine Translation for German Publication No. 102006033421 B3, published Oct. 11, 2007, 13 pgs.

English Machine Translation for German Publication No. 102015012133 A1, published Mar. 24, 2016, 17 pgs.

* cited by examiner

ABNORMALITY DETECTION DEVICE

CROSS-REFERENCE TO RELATED APPLICATION

This application is based upon and claims the benefit of priority from Japanese Patent Application No. 2017-109444 filed on Jun. 1, 2017, the contents of which are incorporated herein by reference.

BACKGROUND OF THE INVENTION

Field of the Invention

The present invention relates to an abnormality detection device for detecting an abnormality in a movable part.

Description of the Related Art

Japanese Laid-Open Patent Publication No. 05-050480 discloses a monitoring method of an injection molding machine. Briefly, this method, at every molding process, detects the vibrations and operating sound of individual operating parts of the injection molding machine with acceleration sensors and microphones, monitors the stability of the cycle time of the molding process based on the period of the detected signals, and finds abnormality in each operating part from the abnormal values of each of the detected signals.

SUMMARY OF THE INVENTION

However, since abnormality detection based on sound is susceptible to the influence of background noise, in many cases, the abnormality of movable parts develops considerably before operation noise is generated to the extent that the abnormality can actually be detected.

It is therefore an object of the present invention to provide an abnormality detection device that enables the detection of abnormality in movable parts in an injection molding machine at an early stage.

The aspect of the present invention resides in an abnormality detection device for detecting an abnormality of a movable part provided in an injection molding machine, comprising: a through hole formed in the movable part or in an adjacent member arranged adjacent to the movable part; and a microphone installed inside the through hole and configured to collect sound generated by the movement of the movable part.

According to the present invention, it is possible to detect an abnormality of the movable part in the injection molding machine at an early stage.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An abnormality detection device according to the present invention will be detailed hereinbelow by describing preferred embodiments with reference to the accompanying drawings.

Figure 1:
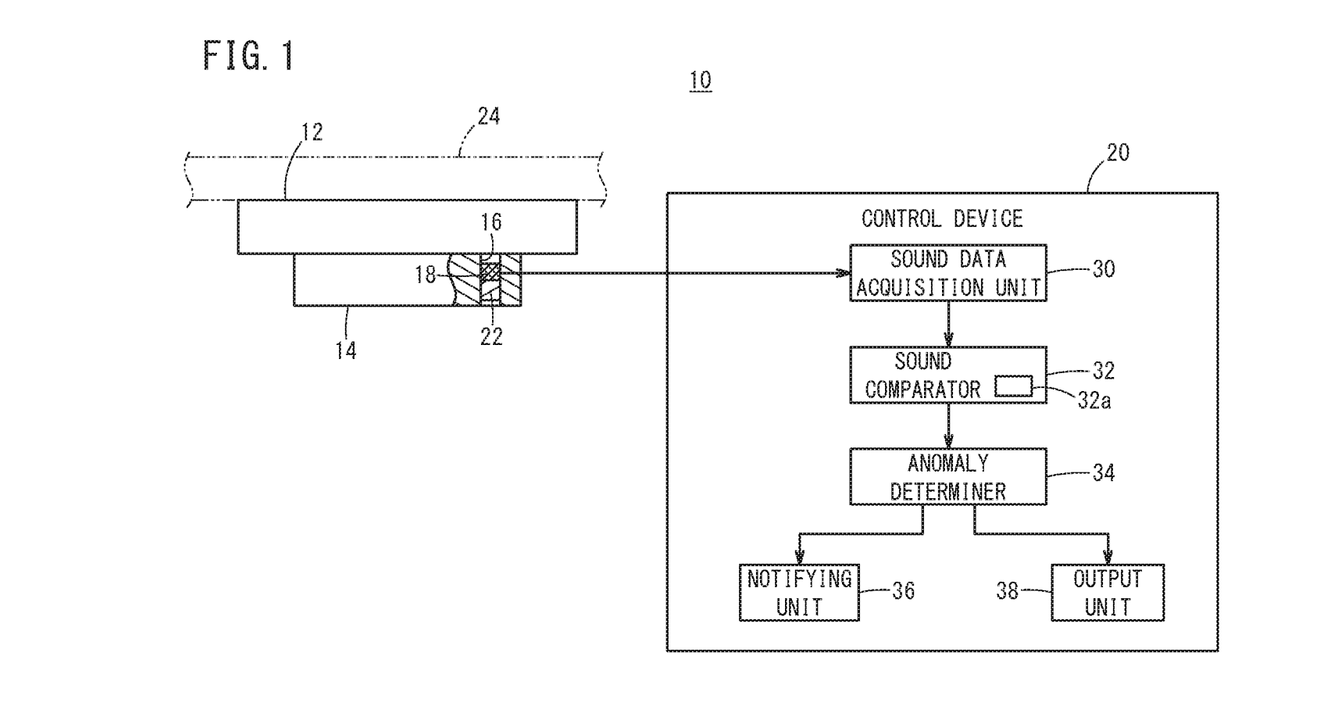
FIG. 1 is a schematic configuration diagram of an abnormality detection device.

FIG. 1 is a schematic configuration diagram of an abnormality detection device 10. The abnormality detection device 10 detects an abnormality of a movable part 12. The abnormality detection device 10 has a through hole 16 formed in an adjacent member 14 arranged adjacent to the movable part 12, a microphone 18 installed inside the through hole 16 for collecting sound generated by the movement of the movable part 12, and a control device 20 for judging the abnormality of the movable part 12 based on the sound data collected by the microphone 18. The microphone 18 may be, for example, an ultrasonic microphone, and is preferably a small microphone. The microphone 18 may communicate with the control device 20 over a wired or wireless connection.

The through hole 16 is formed in the adjacent member 14 so as to face the sound generation position (sound source) where sound is generated by the movement of the movable part 12. In the example shown in FIG. 1, since the sound generation position is on the side of the movable part 12, the through hole 16 is formed in the adjacent member 14 so as to face the movable part 12. It is preferable that the microphone 18 is installed in the through hole 16 a predetermined distance apart from the movable part 12.

With this configuration, the microphone 18 can collect the sound generated by the movement of the movable part 12 through the through hole 16. Further, since the microphone 18 is installed inside the through hole 16, it is possible to suppress collection of background noise (sound other than the sound generated by the movement of the movable part 12, which is an abnormality detection target) by the microphone 18. Therefore, abnormality of the movable part 12 can be detected at an early stage.

In this embodiment, in order to further suppress collection of background noise by the microphone 18, a sound insulator 22 is provided in the through hole 16 opposite the sound generation position with respect to the microphone 18. This further enhances earlier detection of abnormality of the movable part 12. When the microphone 18 is wired to the control device 20, the wire from the microphone 18 is drawn through the sound insulator 22 to the outside. When the microphone 18 is connected to the control device 20 wirelessly, an antenna connected to the microphone 18 may be arranged in the sound insulator 22.

The control device 20 includes a processor such as a CPU and an unillustrated storage medium. The processor functions as the control device 20 of the present embodiment by running a basic program stored in the storage medium. The control device 20 includes a sound data acquisition unit 30, a sound comparator 32, an abnormality determiner 34, a notifying unit 36, and an output unit 38.

The sound data acquisition unit 30 acquires sound data picked up by the microphone 18. The sound data acquisition unit 30 includes an unillustrated A/D converter and the like to convert analog sound data to digital sound data. The sound data acquisition unit 30 outputs the acquired digital sound data to the sound comparator 32.

The sound comparator 32 compares the sound data sent from the sound data acquisition unit 30 with predetermined reference sound data. The sound comparator 32 includes a memory 32a having the reference sound data stored therein. The sound comparator 32 may analyze the sound data forwarded to the sound comparator 32 and compare it with the reference sound data. The sound comparator 32 outputs the comparison result to the abnormality determiner 34. When there are multiple movable parts 12 that are abnormality detection targets, a different piece of reference sound data for each of the movable parts 12 is stored in the memory 32a.

The abnormality determiner 34 determines whether or not the movement of the movable part 12 is abnormal based on the comparison result from the sound comparator 32. If the difference of the sound data acquired by the sound data acquisition unit 30 from the reference sound data does not fall within a predetermined permissible range, the abnormality determiner 34 determines that abnormality has occurred.

When the abnormality determiner 34 determines that the movable part 12 is abnormal, the notifying unit 36 notifies the operator of the occurrence of abnormality. For example, the notifying unit 36 may include a display unit such as a liquid crystal display that shows on the screen that the movable part 12 is abnormal, notifying the operator of the occurrence of abnormality. In addition, the notifying unit 36 may include a speaker that outputs sound or a light emitting device that emits light, and output an alarm sound from the speaker or cause the light emitting device to emit light, thereby notifying the operator of the occurrence of abnormality in the movable part 12. When the abnormality determiner 34 determines that the movable part 12 is normal, the notifying unit 36 may notify the operator of the fact that the movable part 12 is in a normal state.

When the abnormality determiner 34 determines that the movable part 12 is in an abnormal state, the output unit 38 may output to an unillustrated external device an abnormality signal indicating that the movable part 12 is in the abnormal state. Thus, the external device can recognize the abnormality of the movable part 12. The external device may notify the operator that the movable part 12 is abnormal.

Even if there is no adjacent member 14 next to the movable part 12 or even when there is an adjacent member 14, a through hole 16 may be formed in the movable part 12 so that the microphone 18 can be installed inside the through hole 16. Also in this case, the through hole 16 is formed to face the sound generation position where sound is generated by the movement of the movable part 12. Here, the movable part 12 may move or rotate along the guide member 24 (indicated by two-dot chain lines in FIG. 1).

Next, description will be made by giving multiple specific examples to which the through hole 16 and the microphone 18 of the abnormality detection device 10 are applied.

Figure 2:
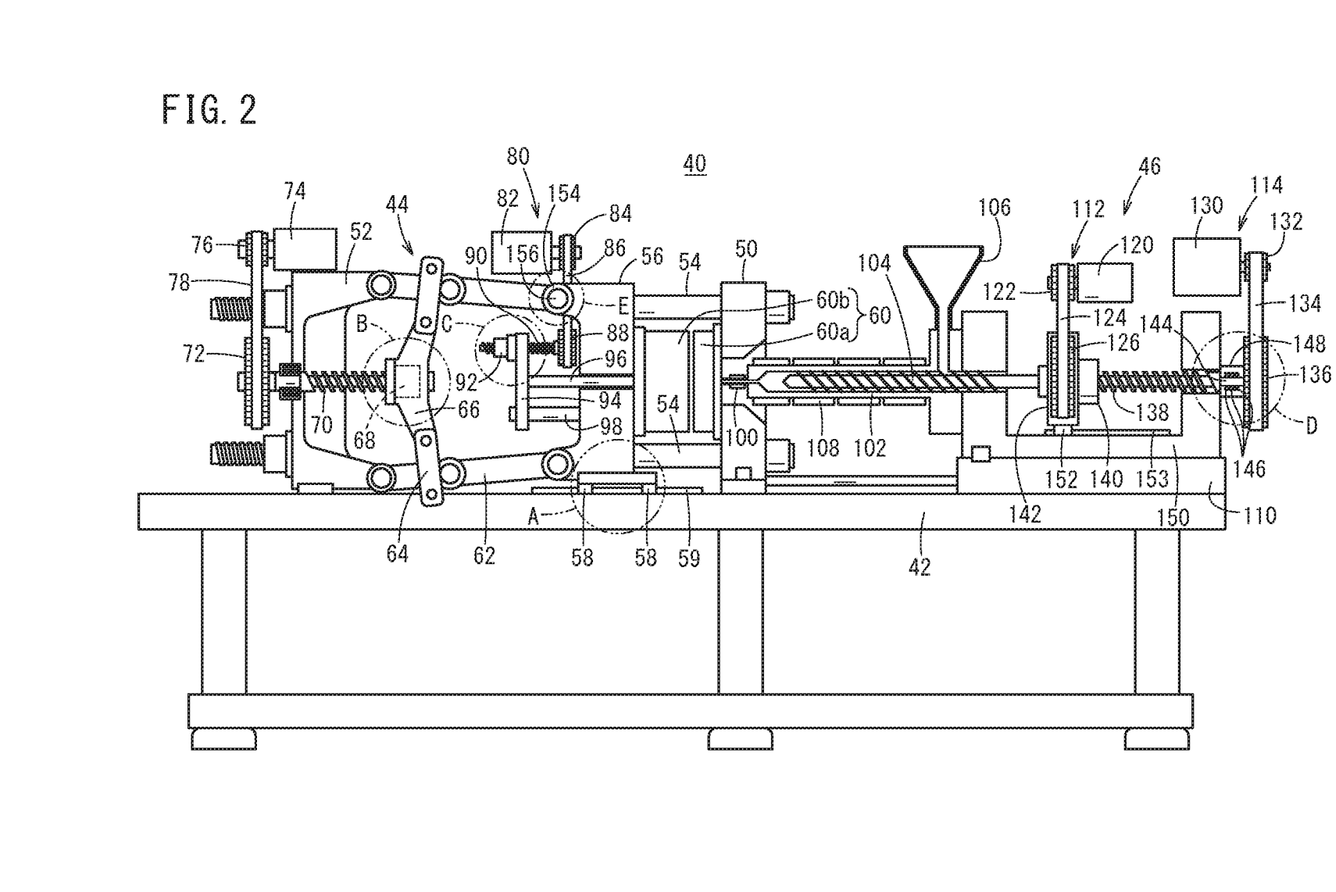
FIG. 2 is a block diagram of an injection molding machine.

The abnormality detection device 10 is applied to, for example, an injection molding machine 40 shown in FIG. 2. The injection molding machine 40 includes a machine base 42, a clamping unit 44, and an injection unit 46 set on the machine base 42.

The clamping unit 44 includes a stationary platen 50, a rear platen 52, and four tie bars 54. The four tie bars 54 couple the stationary platen 50 and the rear platen 52. The four tie bars 54 are arranged so that their axial directions are parallel to each other. A moving platen 56 is disposed between the stationary platen 50 and the rear platen 52. The moving platen 56 is installed on the machine base 42 via the slide portion 58. The slide portion 58 is movable along a guide rail 59 that functions as the guide member 24 and is provided on the machine base 42. Thereby, the slide portion 58 enables the moving platen 56 to move in the axial direction of the tie bars 54.

A mold 60 is mounted between the stationary platen 50 and the moving platen 56. The mold 60 is constituted by a fixed mold half 60a and a movable mold half 60b. The fixed mold half 60a is attached to the stationary platen 50 on the moving platen 56 side, and the movable mold half 60b is attached to the moving platen 56 on the stationary platen 50 side.

A toggle link 62 is provided between the rear platen 52 and the moving platen 56. The toggle link 62 is connected to a crosshead 66 via a cross link 64. A ball screw nut 68 is joined to the crosshead 66. The ball screw nut 68 is screwed on ball screw 70. The ball screw 70 is rotatably supported by the rear platen 52 with the movement of the ball screw 70 in the axial direction constrained. The axial direction of the ball screw 70 is parallel to the axial direction of the tie bars 54.

A driven pulley 72 is provided at the end of the ball screw 70 opposite to the side where the ball screw 70 is screwed into the ball screw nut 68. A driving pulley 76 is provided on the rotary shaft of a mold opening/closing servomotor 74. The driven pulley 72 and the driving pulley 76 are coupled by an annular belt 78. The driving pulley 76, the belt 78, and the driven pulley 72 constitute a power transmission mechanism. Driven by the mold opening/closing servomotor 74, the ball screw 70 rotates via the power transmission mechanism, so that the crosshead 66 connected to the ball screw nut 68 moves along the ball screw 70 that functions as the guide member 24. The movement of the crosshead 66 causes the cross link 64 and the toggle link 62 to move the moving platen 56 along the axial direction of the tie bars 54.

When the moving platen 56 moves toward the stationary platen 50, the movable mold half 60b abuts against the fixed mold half 60a so that the mold 60 is closed. When the moving platen 56 moves to the rear platen 52 side, the movable mold half 60b separates from the fixed mold half 60a so that the mold 60 is opened.

The clamping unit 44 has an ejector mechanism 80 for eject moldings from the movable mold half 60b. The ejector mechanism 80 includes an ejector motor 82, a driving pulley 84, a belt 86, a driven pulley 88, a ball screw 90, a ball screw nut 92, an ejector plate 94, and an ejector pin 96. The axial direction of the ball screw 90 is parallel to the axial direction of the tie bars 54.

The driving pulley 84 is provided on the rotary shaft of the ejector motor 82 while the driven pulley 88 is provided on the ball screw 90 in a non-rotatable manner with respect to the ball screw 90. The belt 86 is held by the driving pulley 84 and the driven pulley 88 so as to transmit rotational force from the driving pulley 84 to the driven pulley 88. The ball screw nut 92 is screwed and engaged with the ball screw 90 that functions as the guide member 24 for guiding the movement of the ball screw nut 92. The ejector plate 94 provided with the ejector pin 96 is connected to the ball screw nut 92.

As the ejector motor 82 rotates, the ball screw 90 rotates via the driving pulley 84, the belt 86, and the driven pulley 88. The rotation of the ball screw 90 causes the ball screw nut 92 and the ejector plate 94 to move in the axial direction of the ball screw 90, and as a result, the ejector pin 96 moves in the axial direction of the ball screw 90. When the ejector pin 96 moves toward the moving platen 56, the moldings are pushed out of the movable mold half 60b and taken out. In order to guide the movement of the ejector plate 94, a guide shaft 98 parallel to the axial direction of the ball screw 90 may be provided.

The injection unit 46 includes a nozzle 100, a cylinder 102, a screw 104, a hopper 106, and a heater 108. The nozzle 100 is arranged at the distal end of the cylinder 102. The cylinder 102 is a hollow member, into which the screw 104 is inserted. The cylinder 102 and the screw 104 extend in the direction along which the mold 60 is opened and closed. The cylinder 102 is equipped with the hopper 106. The hopper 106 feeds a resin material into the cylinder 102. When the resin material put in the hopper 106 is in the form of pellets, the pelletized resin material is melted by the heater 108.

The injection unit 46 is mounted on the machine base 42 via an extruder base 110. The extruder base 110 moves the injection unit 46 in the direction along which the mold 60 is opened and closed. The injection unit 46 has a screw driving mechanism 112 for rotating the screw 104 and an injection mechanism 114 for injecting the resin material from the nozzle 100.

The screw driving mechanism 112 includes a screw rotating motor 120, a driving pulley 122, a belt 124, and a driven pulley 126. The driving pulley 122 is provided so as to be rotatable integrally with the rotary shaft of the screw rotating motor 120 while the driven pulley 126 is provided so as to be rotatable integrally with the screw 104. The belt 124 is held by the driving pulley 122 and the driven pulley 126 to transmit rotational force from the driving pulley 122 to the driven pulley 126.

As the screw rotating motor 120 rotates, the screw 104 rotates via the driving pulley 122, the belt 124, and the driven pulley 126. The rotation of the screw 104 conveys the resin material toward the nozzle 100.

The injection mechanism 114 includes an injection motor 130, a driving pulley 132, a belt 134, a driven pulley 136, a ball screw 138, a ball screw nut 140, and a pusher plate 142. The driving pulley 132 is arranged so as to be rotatable integrally with the rotary shaft of the injection motor 130 while the driven pulley 136 is provided so as to be rotatable integrally with the ball screw 138. The ball screw 138 and the driven pulley 136 are connected via a rotary shaft 144, which is rotatably supported by a bearing 146. The bearing 146 is supported by a bearing housing 148.

The belt 134 is held by the driving pulley 132 and the driven pulley 136 so as to transmit rotational force from the driving pulley 132 to the driven pulley 136. The ball screw nut 140 is screwed and engaged with a ball screw 138 that extends in the axial direction of the screw 104. The pusher plate 142 is coupled to the ball screw nut 140. The pusher plate 142 supports the screw driving mechanism 112 and rotatably supports the driven pulley 126 of the screw driving mechanism 112.

As the injection motor 130 rotates, the ball screw 138 rotates via the driving pulley 132, the belt 134, and the driven pulley 136. As a result, the pusher plate 142 connected to the ball screw nut 140 moves in the axial direction of the ball screw 138. The movement of the pusher plate 142 causes the screw 104 to move inside the cylinder 102 along the axial direction of the ball screw 138. As the screw 104 moves toward the nozzle 100, the resin material stored at the distal end side of the screw 104 in the cylinder 102 is ejected from the nozzle 100.

The injection unit 46 includes a base member 150 that is attached to the extruder base 110 and supports the injection mechanism 114. The base member 150 has the bearing housing 148 attached thereto. Further, the pusher plate 142 is attached to the base member 150 via a slide portion 152. The slide portion 152 can move along a guide rail 153 that functions as the guide member 24 provided on the base member 150.

In the injection molding machine 40 configured as above, the abnormality detection device 10 of the present embodiment is used to detect anomalies, for example, in the slide portion 58 indicated by a circle A, in the ball screw nut 68 indicated by a circle B as the movable part 12, in a ball screw nut 92 indicated by a circle C as the movable part 12, in a bearing 146 indicated by a circle D as the movable part 12, and in a toggle bush 154 of a toggle link 62 indicated by a circle E as the movable part 12.

The moving platen 56 has a toggle pin 156 at the joint where the moving platen 56 is connected with the toggle link 62 while the toggle link 62 has a toggle bush 154 at the joint where the toggle link 62 is connected with the moving platen 56. The toggle bush 154 is engaged with the toggle pin 156 so as to be able to rotate about the toggle pin 156. That is, the toggle pin 156 functions as the guide member 24 for guiding the toggle bush 154 in rotating.

Figure 3:
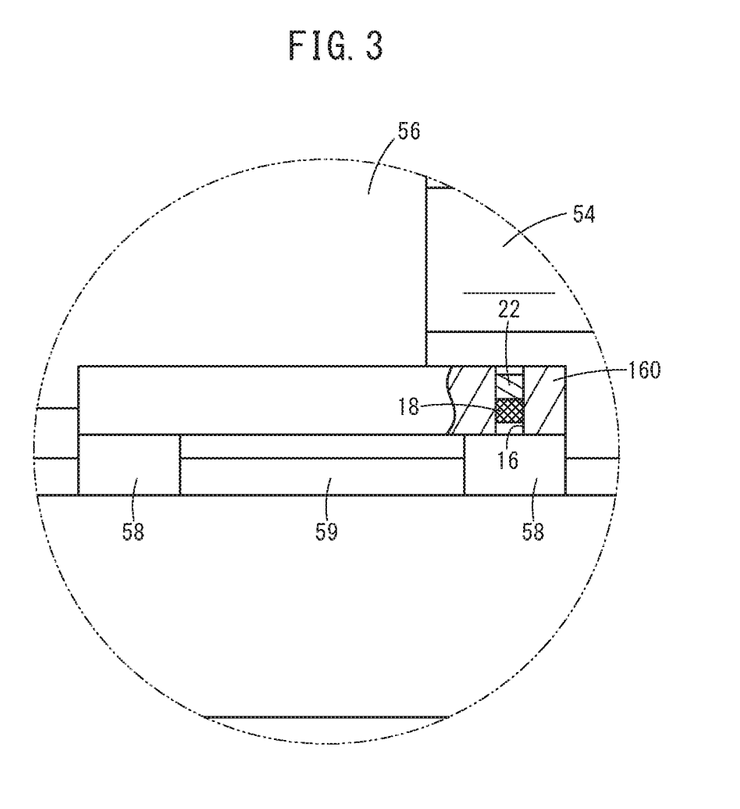
FIG. 3 is a diagram showing an example of how a microphone is installed when a slide portion shown in FIG. 2 is a movable part of FIG. 1.

FIG. 3 is a diagram showing an example of how the microphone 18 is installed when the slide portion 58 is the movable part 12. The slide portion 58 is joined to the moving platen 56 via a joining member (adjacent member) 160. The moving platen 56, the joining member 160, and the slide portion 58 move integrally. The through hole 16 is formed in the joining member 160 so as to face the slide portion 58. The microphone 18 is installed inside the through hole 16 a predetermined distance apart from the slide portion 58. A sound insulator 22 is arranged inside the through hole 16 opposite the sound generation position with respect to the microphone 18, that is, opposite the slide portion 58 with respect to the microphone 18. Thereby, the abnormality detection device 10 can detect an abnormality in the movement of the slide portion 58 at an earlier stage.

In the example shown in FIG. 3, the through hole 16 is formed in the joining member 160 but the through hole 16 may be formed in the slide portion 58. In this case, the through hole 16 is formed in the slide portion 58 so as to face the guide rail 59 that functions as the guide member 24, and the microphone 18 is installed inside the through hole 16 a predetermined distance apart from the guide rail 59.

Though the slide portion 58 has been described with reference to FIG. 3, the slide portion 152 for moving the pusher plate 142 may be configured in the same manner to have a through hole 16 and a microphone 18.

Figure 4A:
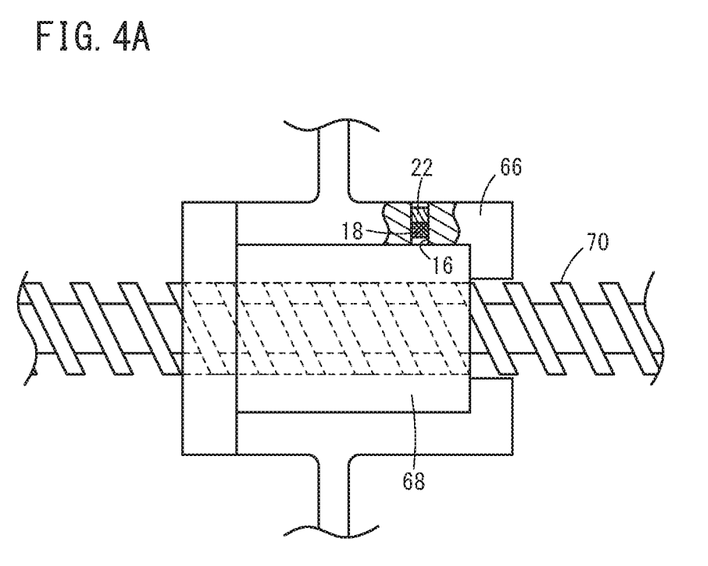
FIGS. 4A and 4B are diagrams showing an example of how a microphone is installed when a ball screw nut shown in FIG. 2 is a movable part of FIG. 1.
Figure 4B:
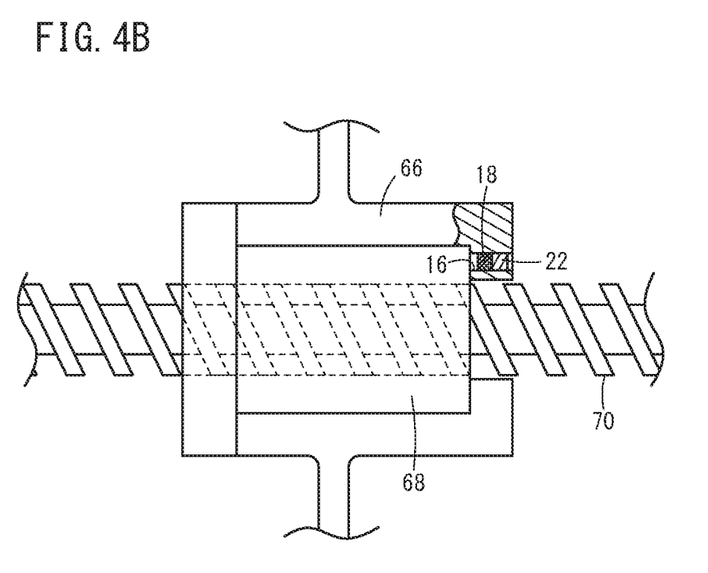

FIGS. 4A and 4B are diagrams showing an example of how a microphone 18 is installed when the ball screw nut 68 is the movable part 12. As shown in FIGS. 4A and 4B, a through hole 16 is formed in the crosshead 66 as the adjacent member 14 so as to face the ball screw nut 68. The microphone 18 is installed inside the through hole 16 a predetermined distance apart from the ball screw nut 68. A sound insulator 22 is arranged inside the through hole 16 opposite the sound generation position with respect to the microphone 18, that is, opposite the ball screw nut 68 with respect to the microphone 18. Thereby, the abnormality detection device 10 can detect an abnormality in the movement of the ball screw nut 68 at an earlier stage.

FIG. 4A shows an example in which the through hole 16 is formed in the crosshead 66 along the direction perpendicular to the axial direction of the ball screw 70 on which the ball screw nut 68 is screwed. FIG. 4B shows an example in which the through hole 16 is formed in the crosshead 66 along the direction parallel to the axial direction of the ball screw 70 on which the ball screw nut 68 is screwed.

In the examples shown in FIGS. 4A and 4B, the through hole 16 is formed in the crosshead 66 so as to face the ball screw nut 68 but the through hole 16 may be formed in the crosshead 66 so as to face the ball screw 70 that functions as the guide member 24 of the ball screw nut 68. The microphone 18 is disposed inside the through hole 16 a predetermined distance apart from the ball screw 70. Arrangement of the microphone 18 and the ball screw 70 with a predetermined space therebetween can prevent interference between the microphone 18 and the ball screw 70.

Figure 5:
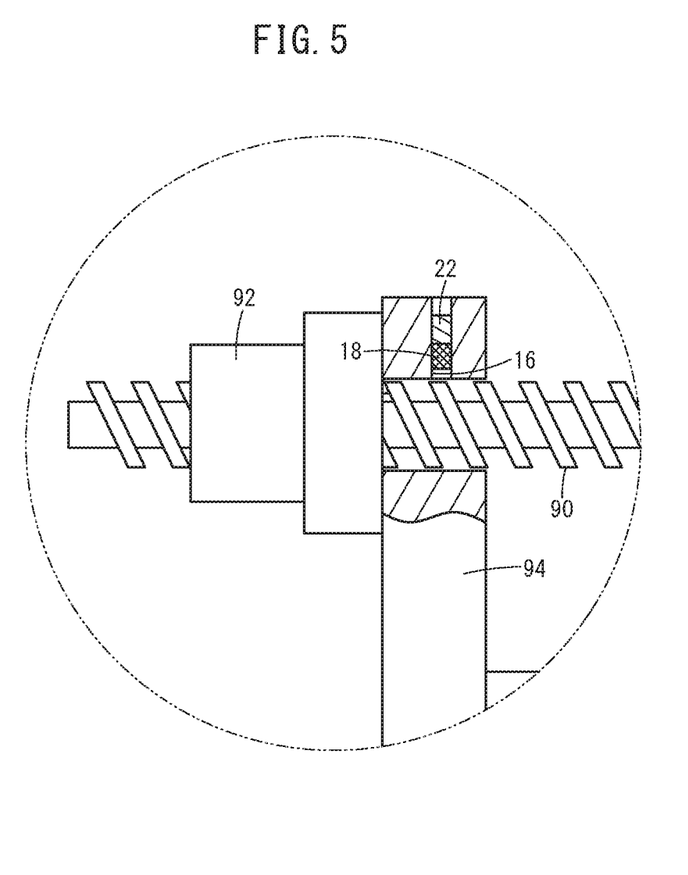
FIG. 5 is a diagram showing an example of how a microphone is installed when a ball screw nut shown in FIG. 2 is a movable part of FIG. 1.

FIG. 5 is a diagram showing an example of how a microphone 18 is installed when the ball screw nut 92 is the movable part 12. A through hole 16 is formed in the ejector plate (adjacent member) 94 connected to the ball screw nut 92 so as to face the ball screw 90 that functions as the guide member 24 for guiding the movement of the ball screw nut 92. The microphone 18 is installed inside the through hole 16 a predetermined distance apart from the ball screw nut 92. Thereby, it is possible to prevent the microphone 18 from interfering with the ball screw nut 92. A sound insulator 22 is arranged inside the through hole 16 opposite the sound generation position with respect to the microphone 18, that is, opposite the ball screw 90 with respect to the microphone 18. Thereby, the abnormality detection device 10 can detect an abnormality in the movement of the ball screw nut 92 at an earlier stage.

Further, in FIG. 5, the ball screw 90 can be regarded as the movable part 12. In this case, it can also be said that the through hole 16 is formed in the ejector plate (adjacent member) 94 next to the ball screw 90 via the ball screw nut 92 so as to face the ball screw 90.

Figure 6A:
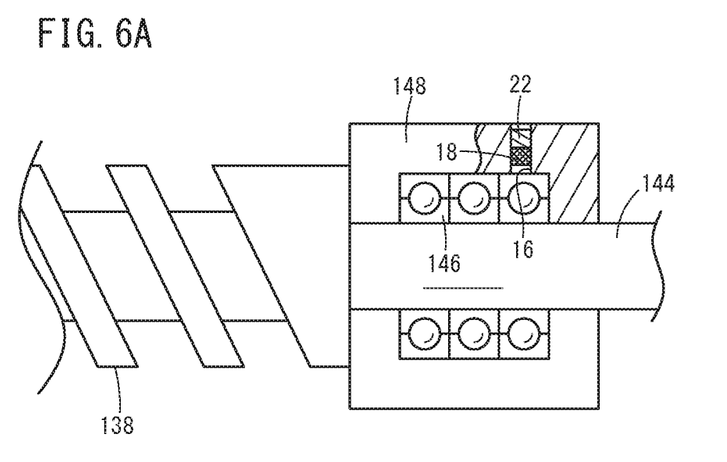
FIGS. 6A and 6B are diagrams showing an example of how a microphone is installed when a bearing supported by a bearing housing shown in FIG. 2 is a movable part.
Figure 6B:
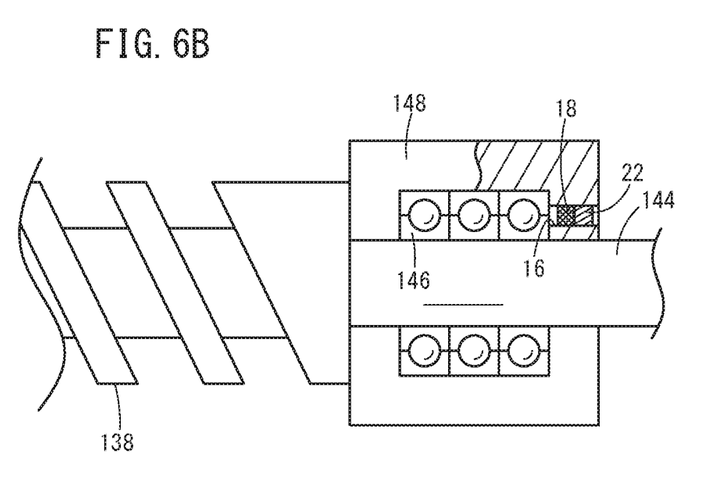

FIGS. 6A and 6B are diagrams showing an example of how a microphone 18 is installed when the bearing 146 supported by the bearing housing 148 is the movable part 12. The through hole 16 is formed in the bearing housing 148 so as to face the bearing 146. The microphone 18 is installed inside the through hole 16 a predetermined distance apart from the bearing 146. A sound insulator 22 is arranged inside the through hole 16 opposite the sound generation position with respect to the microphone 18, that is, opposite the bearing 146 with respect to the microphone 18. Thereby, the abnormality detection device 10 can detect an abnormality in the movement of the bearing 146 at an earlier stage.

Here, FIG. 6A shows an example in which the through hole 16 is formed in the bearing housing 148 along the direction perpendicular to the axial direction of the rotary shaft 144 pivotally supported by the bearing 146. FIG. 6B shows an example in which the through hole 16 is formed in the bearing housing 148 along the direction parallel to the axial direction of the rotary shaft 144 pivotally supported by the bearing 146.

Figure 7:
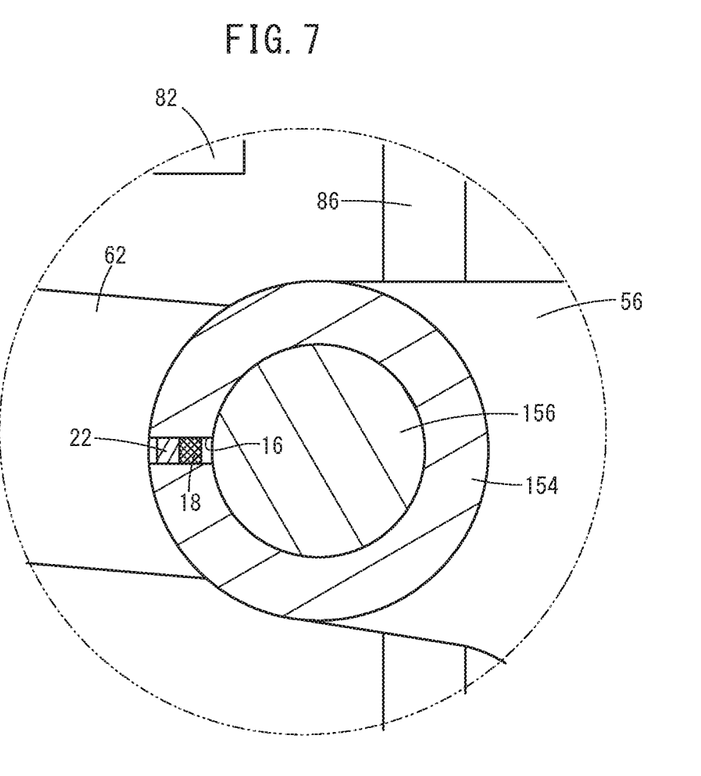
FIG. 7 is a view showing an example of how a microphone is installed when a toggle bush shown in FIG. 1 is a movable part of FIG. 1.

FIG. 7 is a diagram showing an example of how a microphone 18 is installed when the toggle bush 154 is the movable part 12. The through hole 16 is formed inside the toggle bush 154 so as to face the toggle pin 156. The microphone 18 is installed inside the through hole 16 a predetermined distance apart from the toggle pin 156. Thereby, it is possible to prevent interference between the microphone 18 and the toggle pin 156. A sound insulator 22 is arranged inside the through hole 16 opposite the sound generation position with respect to the microphone 18, that is, opposite the toggle pin 156 with respect to the microphone 18. Thereby, the abnormality detection device 10 can detect an abnormality in the movement of the toggle bush 154 at an earlier stage.

Technical Ideas Obtained from Embodiments

Technical ideas that can be grasped from the above embodiments will be described hereinbelow.

The abnormality detection device (10) for detecting an abnormality of the movable part (12) provided in the injection molding machine (40), includes: the through hole (16) formed in the movable part (12) or in the adjacent member (14) arranged adjacent to the movable part (12); and the microphone (18) installed inside the through hole (16) and configured to collect sound generated by the movement of the movable part (12).

This configuration makes it possible to suppress collection of background noise with the microphone (18), so that the microphone (18) can efficiently collect the sound generated by the movement of the movable part (12). As a result, it is possible to detect an abnormality of the movable part (12) in the injection molding machine (40) at an early stage.

The through hole (16) may be formed in the adjacent member (14) so as to face the movable part (12), and the microphone (18) may be installed a predetermined distance apart from the movable part (12). This arrangement makes it possible to suppress collection of background noise by the microphone (18), so that the microphone (18) can efficiently collect the sound generated by the motion of the movable part (12). As a result, it is possible to detect an abnormality of the movable part (12) at an early stage.

The movable part (12) may be configured to be movable relative to the guide member (24). The through hole (16) may be formed in the adjacent member (14) so as to face the guide member (24), and the microphone (18) may be installed a predetermined distance apart from the guide member (24). This arrangement makes it possible to suppress collection of background noise with the microphone (18), so that the microphone (18) can efficiently collect the sound generated by the movement of the movable part (12). As a result, it is possible to detect an abnormality of the movable part (12) at an early stage.

The movable part (12) may be configured to be movable relative to the guide member (24). The through hole (16) may be formed in the movable part (12) so as to face the guide member (24), and the microphone (18) may be installed a predetermined distance apart from the guide member (24). This arrangement makes it possible to suppress collection of background noise by the microphone (18), so that the microphone (18) can efficiently collect the sound generated by the movement of the movable part (12). As a result, it is possible to detect an abnormality of the movable part (12) at an early stage.

In order to reliably suppress collection of background noise by the microphone (18) through the through hole (16), the sound insulator (22) may be provided inside the through hole (16) opposite the sound generation position where sound is generated by the movement of the movable part (12), with respect to the microphone (18). This configuration further inhibits background noise from being collected by the microphone (18). Therefore, the microphone (18) can more efficiently collect the sound generated by the movement of the movable part (12) and can detect abnormality of the movable part (12) earlier.

The movable part (12) may be the bearing (146), the ball screw nut (68, 92) into which the ball screw (70, 90) is screwed, the ball screw (90), the toggle bush (154) that can rotate relative to the toggle pin (156), or the slide portion (58, 152) that can slide.

The abnormality detection device (10) may further include: the sound data acquisition unit (30) configured to acquire sound data collected by the microphone (18); the sound comparator (32) configured to compare the sound data with reference sound data; and the abnormality determiner (34) configured to determine whether or not the movable part (12) is in an abnormal state based on a result of the comparison performed by the sound comparator (32). As a result, it is possible to determine whether or not the movement of the movable part (12) is normal.

The abnormality detection device (10) may further include further the notifying unit (36) configured to notify an abnormality when the movable part (12) is determined to be in an abnormal state. Thereby, the operator can be notified that the movement of the movable part (12) is abnormal.

The abnormality detection device (10) may further include the output unit (38) configured to output the abnormality signal indicating an abnormality to the external device when the movable part (12) is determined to be in an abnormal state. This makes it possible to recognize an abnormality of the movable part (12) also in an external device.

Though the present invention has been described by referring to the embodiments, the present invention should not be limited to the above embodiments. It goes without saying that various modifications and improvements can be added to the above embodiments. Further, it is also apparent from the scope of claims that embodiments added with such modifications and improvements can be incorporated in the technical scope of the invention.

What is claimed is:

1. An abnormality detection device for detecting an abnormality of a movable part provided in an injection molding machine, comprising:
    a through hole formed in the movable part or in an adjacent member arranged adjacent to the movable part; and
    a microphone installed inside the through hole and configured to collect sound generated by movement of the movable part, wherein:
    in order to suppress collection of background noise with the microphone through the through hole, a sound insulator is provided inside the through hole opposite a sound generation position where sound is generated by the movement of the movable part, with respect to the microphone.

2. The abnormality detection device according to claim 1, wherein:
    the through hole is formed in the adjacent member so as to face the movable part; and
    the microphone is installed a predetermined distance apart from the movable part.

3. The abnormality detection device according to claim 1, wherein:
    the movable part is configured to be movable relative to a guide member;
    the through hole is formed in the adjacent member so as to face the guide member; and
    the microphone is installed a predetermined distance apart from the guide member.

4. The abnormality detection device according to claim 1, wherein:
    the movable part is configured to be movable relative to a guide member;
    the through hole is formed in the movable part so as to face the guide member; and
    the microphone is installed a predetermined distance apart from the guide member.

5. The abnormality detection device according to claim 1, wherein the movable part is a bearing, a ball screw nut into which a ball screw is screwed, a ball screw, a toggle bush that can rotate relative to a toggle pin, or a slide portion that can slide.

6. The abnormality detection device according to claim 1, further comprising:
    a sound data acquisition unit configured to acquire sound data collected by the microphone;
    a sound comparator configured to compare the sound data with reference sound data; and
    an abnormality determiner configured to determine whether or not the movable part is in an abnormal state based on a result of the comparison performed by the sound comparator.

7. The abnormality detection device according to claim 1, further comprising a notifying unit configured to notify an abnormality when the movable part is determined to be in an abnormal state.

8. The abnormality detection device according to claim 1, further comprising an output unit configured to output an abnormality signal indicating an abnormality to an external device when the movable part is determined to be in an abnormal state.

* * * * *